(12) United States Patent
Rice

(10) Patent No.: US 10,107,124 B2
(45) Date of Patent: Oct. 23, 2018

(54) MODULAR INSTRUMENTATION EGRESS SEAL FOR A GAS TURBINE ENGINE

(71) Applicant: United Technologies Corporation, Hartford, CT (US)

(72) Inventor: William W. Rice, Portland, CT (US)

(73) Assignee: United Technologies Corporation, Farmington, CT (US)

(*) Notice: Subject to any disclaimer, the term of this patent is extended or adjusted under 35 U.S.C. 154(b) by 503 days.

(21) Appl. No.: 14/770,361

(22) PCT Filed: Feb. 25, 2014

(86) PCT No.: PCT/US2014/018148
§ 371 (c)(1),
(2) Date: Aug. 25, 2015

(87) PCT Pub. No.: WO2014/130980
PCT Pub. Date: Aug. 28, 2014

(65) Prior Publication Data
US 2016/0010479 A1    Jan. 14, 2016

Related U.S. Application Data

(60) Provisional application No. 61/768,961, filed on Feb. 25, 2013.

(51) Int. Cl.
*F01D 11/00* (2006.01)
*F01D 21/00* (2006.01)
(Continued)

(52) U.S. Cl.
CPC ............ *F01D 11/005* (2013.01); *F01D 17/02* (2013.01); *F01D 21/003* (2013.01); *F01D 25/24* (2013.01);
(Continued)

(58) Field of Classification Search
CPC ...... F01D 11/005; F01D 11/20; F01D 21/003; F01D 17/02; F01D 17/04; F01D 17/06; F01D 17/08; F01D 17/085; F01D 27/24; G01M 15/14; F05D 2220/32; F05D 2240/55; F05D 2260/201; F05D 2260/202; F16J 15/04; H01B 17/308; Y10S 277/919; H02G 3/0616; H02G 9/10; H02G 15/013; H01R 13/5208; G01B 7/14; G01L 19/0681; G01K 13/02; G01K 2013/024; G01K 1/14
(Continued)

(56) References Cited

U.S. PATENT DOCUMENTS 4,244,221 A    1/1981  Scott
4,267,401 A    5/1981  Wilkinson
(Continued)

OTHER PUBLICATIONS

EP search report for EP14753888.8 dated Oct. 5, 2016.

*Primary Examiner* — Mark Laurenzi
*Assistant Examiner* — Mickey France
(74) *Attorney, Agent, or Firm* — O'Shea Getz P.C.

(57) ABSTRACT

A modular egress seal assembly includes an annular plate with an axially extending aperture. A base plate is mountable to the annular plate. The base plate includes an aperture extending along the axis when said base plate is mounted to the annular plate thereby forming an axial passageway and a cover plate mountable to said annular plate.

9 Claims, 11 Drawing Sheets

(51) Int. Cl.
*F16J 15/04* (2006.01)
*F16L 3/237* (2006.01)
*F01D 17/02* (2006.01)
*F01D 25/24* (2006.01)
*G01M 15/14* (2006.01)
*H01R 13/52* (2006.01)
*H02G 3/08* (2006.01)

(52) U.S. Cl.
CPC ............ *F16J 15/04* (2013.01); *F16L 3/237* (2013.01); *G01M 15/14* (2013.01); *H01R 13/5208* (2013.01); *H02G 3/088* (2013.01); *F05D 2220/32* (2013.01); *F05D 2240/55* (2013.01); *F05D 2260/12* (2013.01)

(58) Field of Classification Search
USPC ............ 415/108; 277/602; 29/428; 439/275; 73/865.6, 112.01, 866.5; 174/77 R, 151, 174/23 R, 652, 99 R, 621, 919; 374/144, 374/115, 143
See application file for complete search history.

(56) References Cited

U.S. PATENT DOCUMENTS

| | | |
|---|---|---|
| 4,580,910 A | 4/1986 | Corwin |
| 8,109,159 B1 | 2/2012 | Carella |
| 2008/0132102 A1 | 6/2008 | Hudlet et al. |
| 2008/0136170 A1 | 6/2008 | Liepold et al. |
| 2010/0079136 A1 | 4/2010 | Phillips et al. |
| 2010/0158074 A1* | 6/2010 | Fortier .................. G01K 1/026 374/208 |
| 2011/0277569 A1 | 11/2011 | Rush |
| 2012/0216608 A1* | 8/2012 | Schleif .................... F01D 17/08 73/112.01 |

* cited by examiner

MODULAR INSTRUMENTATION EGRESS SEAL FOR A GAS TURBINE ENGINE

This application claims priority to PCT Patent Appln. No. PCT/US14/18148 filed Feb. 25, 2014, which claims priority to U.S. Patent Appln. No. 61/768,961 filed Feb. 25, 2013.

BACKGROUND

The present disclosure relates to a gas turbine engine and, more particularly, to an instrumentation egress seal therefor.

Gas turbine engines are typically instrumented when under development. An instrumentation probe, for example temperatures and pressures, is connected through a lead that provides a close mechanical fit with the engine case structure. When such an instrumentation probe is utilized in conjunction with a hostile environment such as in a combustor section, turbine section or augmentor section, a potting compound often provides the seal.

Specific mechanical instrumentation egress assemblies are also provided for particular instrumentation installations. Instrumentation, however, may change over the development cycle which necessarily requires a change to the mechanical instrumentation egress assembly. This may result in increased cost and extended development time.

SUMMARY

A modular egress seal assembly according to one disclosed non-limiting embodiment of the present disclosure includes an annular plate with an axially extending aperture. A base plate is mountable to the annular plate, the base plate including an aperture extending along the axis when the base plate is mounted to the annular plate, thereby forming an axial passageway and a cover plate mountable to the annular plate.

A further embodiment of the present disclosure includes, wherein the annular plate includes a multiple of through-through-slots on a top surface thereof.

A further embodiment of any of the foregoing embodiments of the present disclosure includes, wherein the annular plate includes at least one fitting aperture transverse to the axis and extending to the axially extending aperture.

A gas turbine engine according to another disclosed non-limiting embodiment of the present disclosure includes a duct with an instrumentation port along an axis and a modular egress seal assembly mounted to the instrumentation port along the axis.

A further embodiment of any of the foregoing embodiments of the present disclosure includes, wherein the modular egress seal assembly includes a multiple of stacked annular plates.

A further embodiment of any of the foregoing embodiments of the present disclosure includes, wherein at least one of the multiple of stacked annular plates includes a multiple of instrumentation lead through-slots on a top surface thereof.

A further embodiment of any of the foregoing embodiments of the present disclosure includes, wherein at least one of the multiple of stacked annular plates includes at least one fitting aperture transverse to the axis and extending to the axially extending aperture.

A further embodiment of any of the foregoing embodiments of the present disclosure includes, wherein the at least one fitting aperture is located within a block.

A further embodiment of any of the foregoing embodiments of the present disclosure includes, wherein the at least one fitting aperture includes two (2) fitting apertures within a block.

A further embodiment of any of the foregoing embodiments of the present disclosure includes, wherein the at least one fitting aperture is air-cooled.

A method of installing a modular egress seal assembly to an instrumentation port in a gas turbine engine according to another disclosed non-limiting embodiment of the present disclosure includes mounting at least one of one or more annular plates, having an axially extending aperture therein to a base plate that surrounds an instrumentation port; and topping the at least one of one or more annular plates with a cover plate, thereby providing an axial passage into the instrumentation port.

A further embodiment of any of the foregoing embodiments of the present disclosure includes mounting at least one of a multiple of annular plates to the base plate with a multiple of fasteners which extend therethrough.

A further embodiment of any of the foregoing embodiments of the present disclosure includes threading an instrumentation lead through one of one or more instrumentation lead through-slots located in a top surface and extending to the aperture of the at least one of the one or more annular plates.

A further embodiment of any of the foregoing embodiments of the present disclosure includes sealing the instrumentation lead in the instrumentation lead slot with a potting compound.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
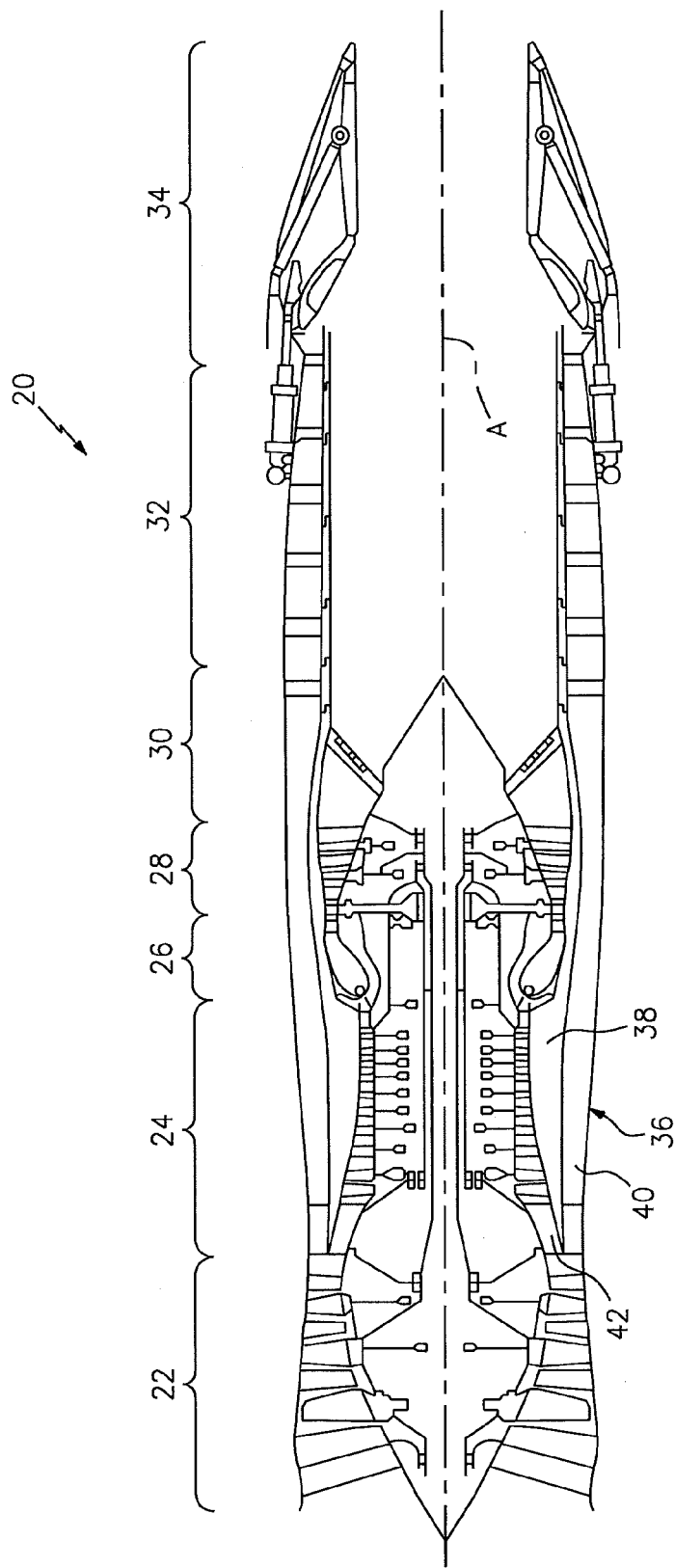
FIG. 1 is a general schematic view of an exemplary gas turbine engine.

FIG. 1 schematically illustrates a gas turbine engine 20. The gas turbine engine 20 is disclosed herein as a two-spool low-bypass augmented turbofan that generally incorporates a fan section 22, a compressor section 24, a combustor section 26, a turbine section 28, an augmenter (afterburner) section 30, an exhaust duct section 32, and a nozzle system 34 along a central longitudinal engine axis A. Although depicted as an augmented low bypass turbofan in the disclosed non-limiting embodiment, it should be understood that the concepts described herein are applicable to other gas turbine engines including non-augmented engines, geared architecture engines, direct drive turbofans, turbojet, turboshaft, multi-stream variable cycle and other engine architectures.

An outer structure 36 and an inner structure 38 define a generally annular secondary airflow path 40 around a core primary airflow path 42. Various structure and modules may define the outer structure 36 and the inner structure 38 which essentially define an exoskeleton to support the rotational hardware therein.

Figure 2:
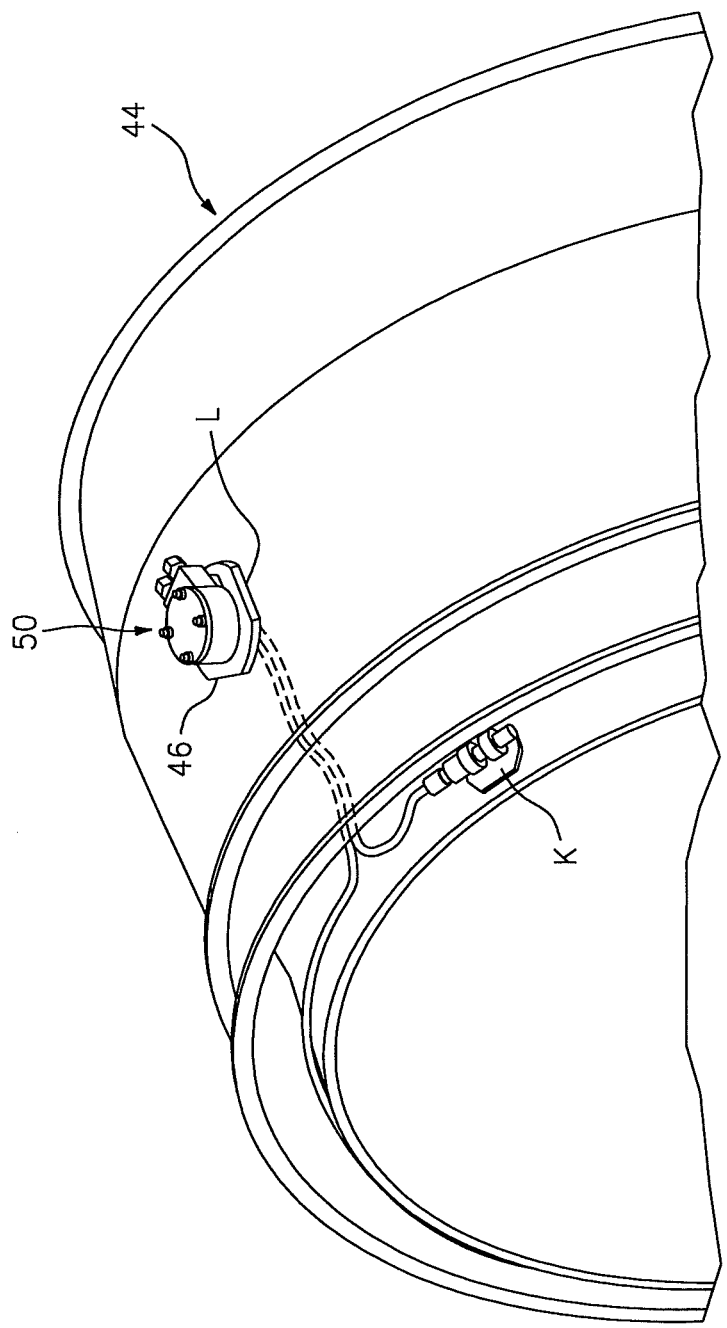
FIG. 2 is an expanded perspective view of a duct of the gas turbine engine with a modular egress seal assembly.

With reference to FIG. 2, a modular egress seal assembly 50 operates to seal a multiple of instrumentation leads L from, for example only, a duct 44 such as a forward augmentor duct of the augmenter section 30 (FIG. 1). The modular egress seal assembly 50 provides for selective sealed egress of a multiple of instrumentation leads L from thermocouples or other sensors through an instrumentation port 46. The modular egress seal assembly 50 in one disclosed non-limiting embodiment provides a variable instrumentation count such as, for example, 12-60 leads L and two (2) pressure transducers K such as those manufactured by Kulite Semiconductor Products, Inc. of New Jersey USA.

Figure 3:
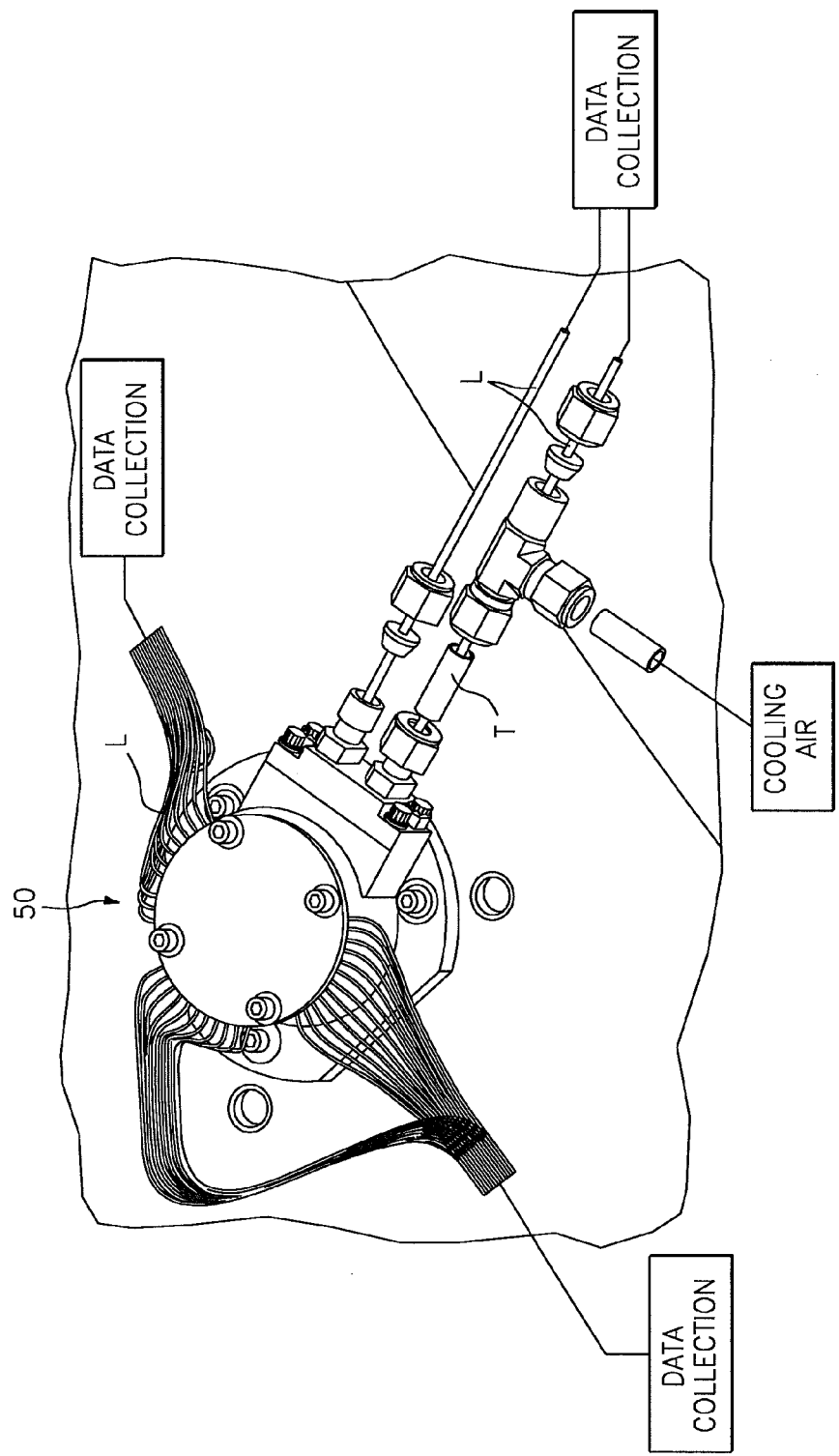
FIG. 3 is an expanded view of the modular egress seal assembly according to one disclosed non-limiting embodiment.

With reference to FIG. 3, the pressure transducers K also communicate through lead wires L which may or may not be located within an armored conduit T through which cooling air may be communicated. It should be appreciated that many different types and numbers of instrumentation leads, wires, air-cooled conduits, non air-cooled conduits and other communication paths may be alternatively or additionally accommodated.

Figure 4:
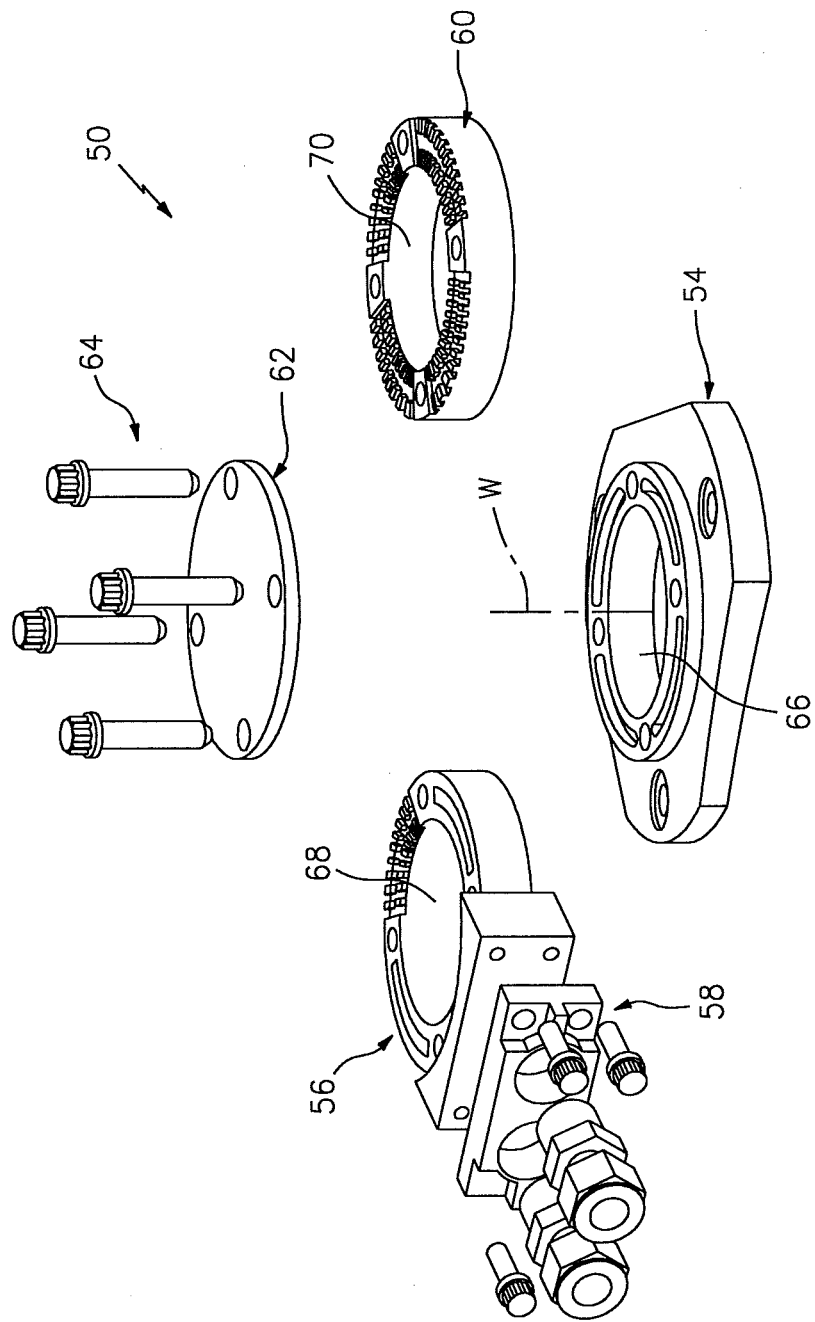
FIG. 4 is an exploded view of the modular egress seal assembly.

With reference to FIG. 4, the modular egress seal assembly 50 generally includes a base plate 54, an egress seal annular plate 56, an egress seal fitting assembly 58, an instrumentation annular plate 60, a cover plate 62 and a multiple of fasteners 64. It should be appreciated that many different types of plates may alternatively or additionally provided.

The base plate 54 receives one or more of the annular plates 56, 60 upon which is stacked the cover plate 62 and retained by the fasteners 64. The base plate 54, the egress seal annular plate 56 and the instrumentation annular plate 60 generally includes a respective aperture 66, 68, 70 defined about an egress seal axis W. The apertures 66, 68, 70 provide a passage for the instrumentation leads L from the instrumentation port 46 (FIG. 3).

Figure 5:
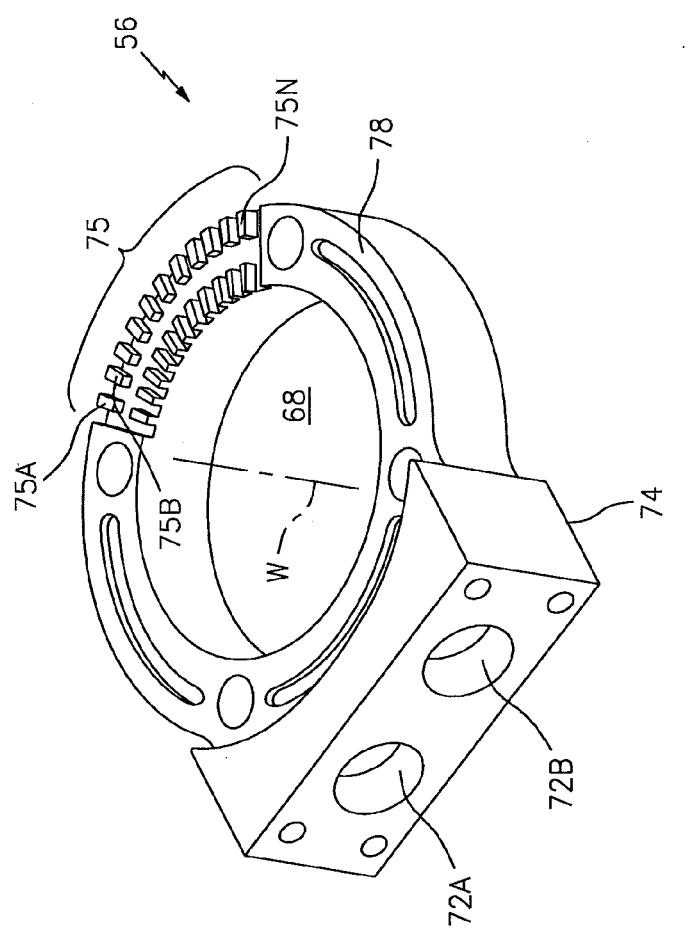
FIG. 5 is an expanded perspective view of an egress seal annular plate of the modular egress seal assembly.
Figure 6:
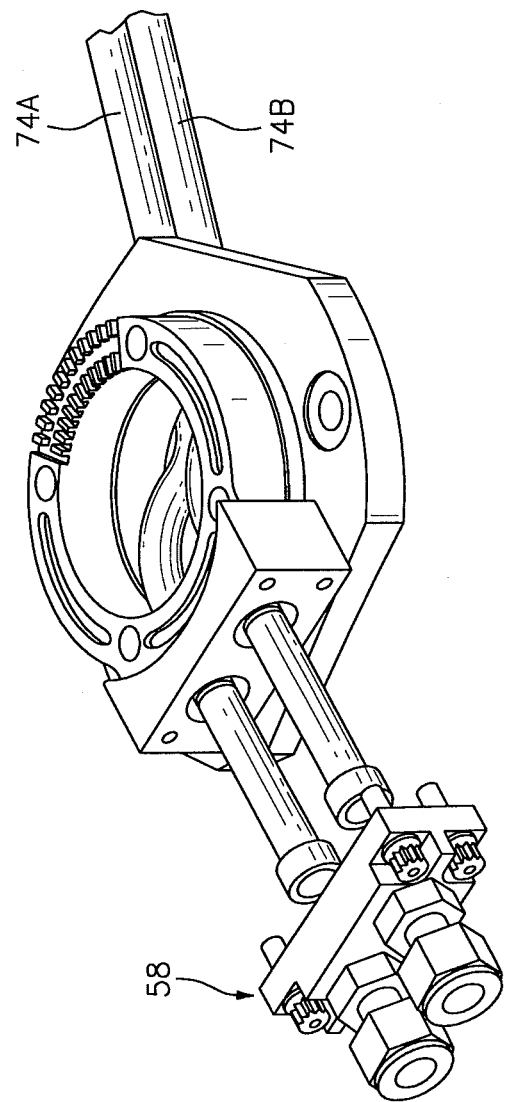
FIG. 6 is an expanded perspective view of an egress seal fitting assembly of the modular egress seal assembly.

With reference to FIG. 5, the egress seal annular plate 56 includes a multiple—two shown—of fitting apertures 72A, 72B, transverse to the axis W and in communication with the aperture 68. The fitting apertures 72A, 72B are located within a block 74 onto which the egress seal fitting assembly 58 may be fastened to receive, for example, pressure transducers (not shown) and air cooling conduits 74A, 74B (FIG. 6). The egress seal annular plate 56 also includes an instrumentation lead through-slot array 75 with a multiple of instrumentation lead through-slots 75A, 75B . . . 75n, along a top surface 78 thereof in communication with the aperture 68. In one disclosed non-limiting embodiment, twelve (12) instrumentation lead through-slots 75 are provided, however, any number will benefit herefrom. Each of the multiple of instrumentation lead through-slots 75A-75n is capable of routing, for example, a thermocouple lead that may be sealed therein by a high-temp, e.g., about 1800 F (538 C) capability potting material. It should be appreciated that unused instrumentation lead through-slots 75 may be completely filled and closed off with potting compound or other seal.

Figure 7:
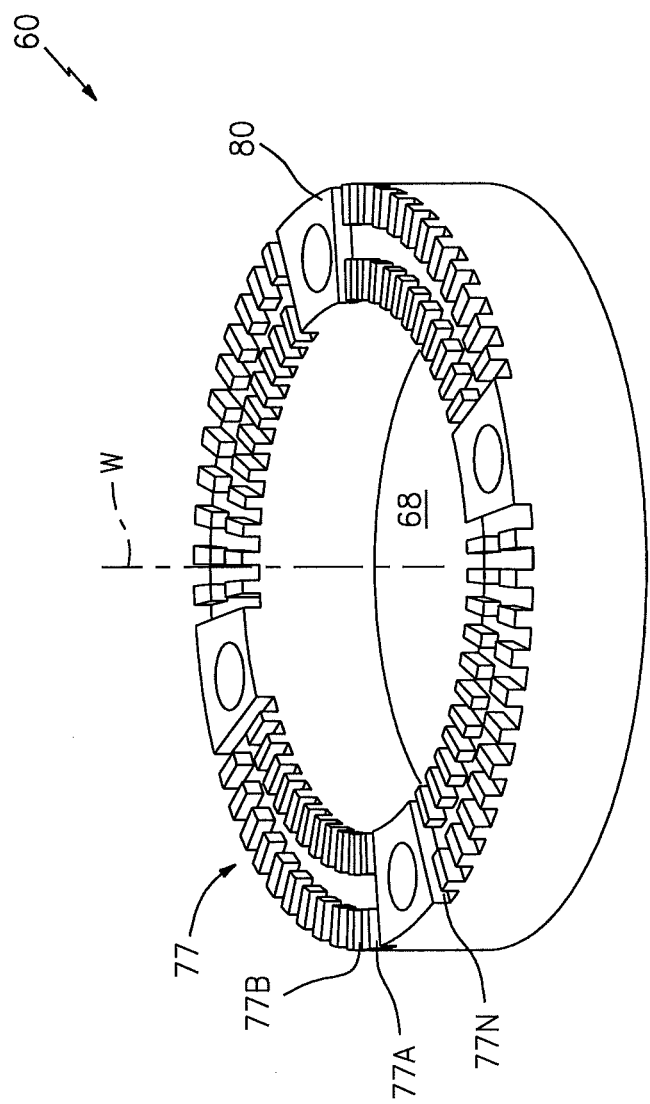
FIG. 7 is an expanded perspective view of an instrumentation annular plate of the modular egress seal assembly.

With reference to FIG. 7, the instrumentation annular plate 60 includes an instrumentation lead through-slot array 77 with a multiple of instrumentation lead through-slots 77A, 77B . . . 77n along a top surface 80 thereof in communication with the aperture 68. In one disclosed non-limiting embodiment, a forty-eight (48) instrumentation lead through-slots array 77 is provided around the top surface 80 provided, however, any number will benefit herefrom.

Figure 8:
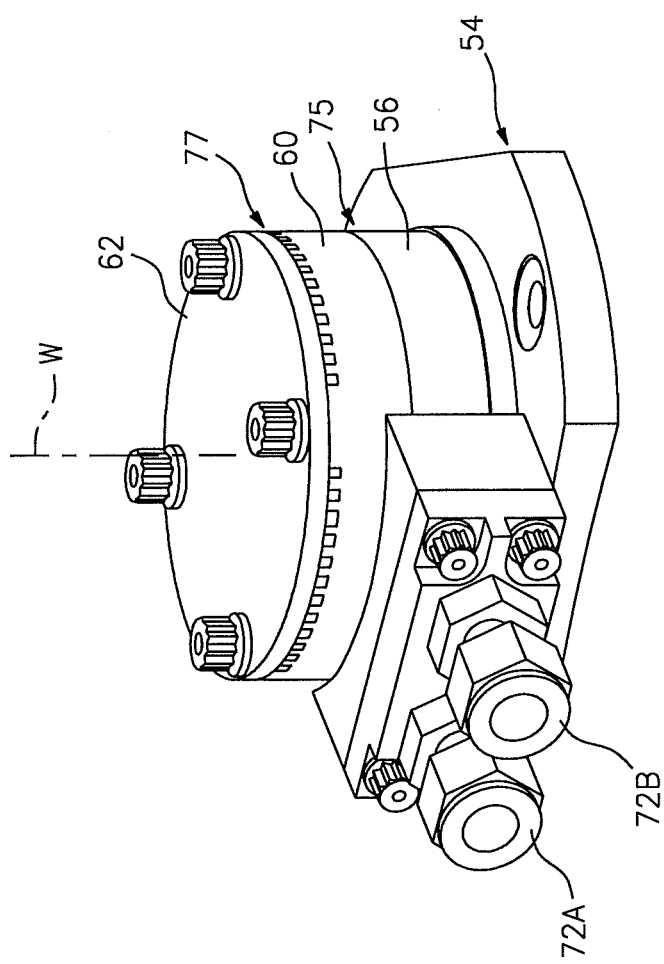
FIG. 8 is an expanded perspective view of the modular egress seal assembly assembled according to one arrangement.
Figure 9:
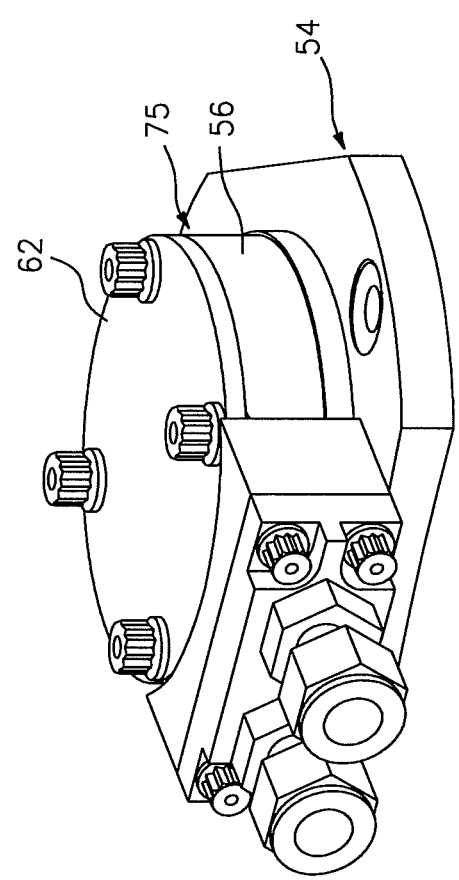
FIG. 9 is an expanded perspective view of the modular egress seal assembly assembled according to another arrangement.
Figure 10:
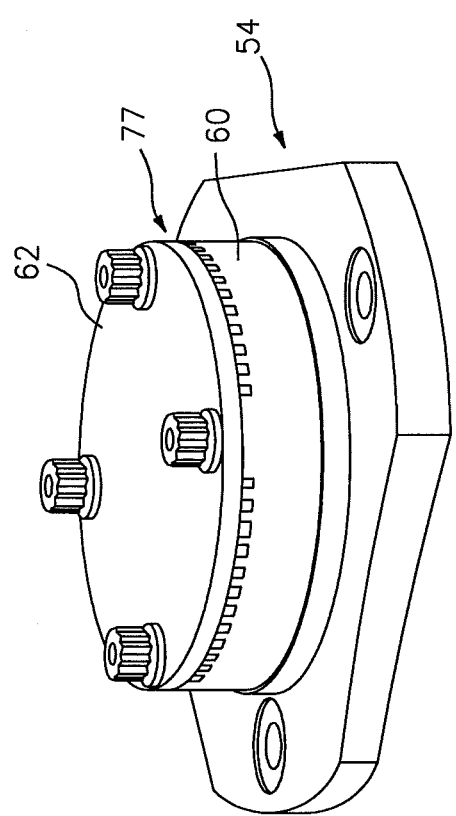
FIG. 10 is an expanded perspective view of the modular egress seal assembly assembled according to another arrangement.
Figure 11:
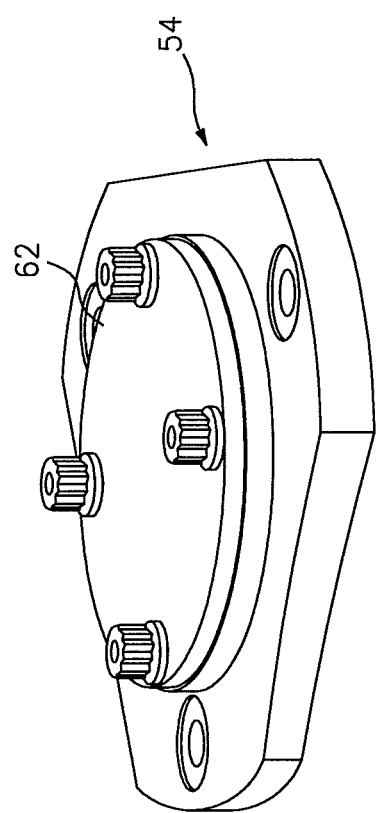
FIG. 11 is an expanded perspective view of the modular egress seal assembly assembled according to another arrangement.

Assembly of the egress seal annular plate 56, the instrumentation annular plate 60 and the cover plate 62 to the base plate 54 provides for egress of, for example, sixty (60) total instrumentation lead through-slots 75, 77 and two (2) fitting apertures 72A, 72B (FIG. 8). Alternately, assembly of the egress seal annular plate 56, and the cover plate 62 to the base plate 54 provides for egress of twelve (12) instrumentation lead through-slots 75 and two (2) fitting apertures 72A, 72B (FIG. 8). Alternately, assembly of the instrumentation annular plate 60 and the cover plate 62 to the base plate 54 provides for egress of forty-eight (48) instrumentation lead through-slots 75 (FIG. 10). Alternately, assembly of the cover plate 62 to the base plate 54 seals the forward augmentor duct 52 (FIG. 11). This list of alternatives is not exclusive. It should be appreciated that although only one of each plate is disclosed in the various alternative examples, any number of plates may be combined to provide a desired instrumentation egress combination.

The modular egress seal assembly 50 facilitates the egress of significant numbers of instrumentation leads L through a relatively small instrumentation port which, in the disclosed non-limiting embodiment may be of only 2 inches (50 mm) diameter. Furthermore, the modularity facilitates development as the instrumentation needs may change and the port may eventfully be sealed with the cover plate 62 when instrumentation is no longer required.

It should be understood that like reference numerals identify corresponding or similar elements throughout the several drawings. It should also be understood that although a particular component arrangement is disclosed in the illustrated embodiment, other arrangements will benefit herefrom.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A modular egress seal assembly comprising:
   an egress seal annular plate with a first aperture defined about an axis;
   a base plate including a second aperture extending along the axis;
   an instrumentation annular plate including a third aperture extending along the axis
   a cover plate; and
   an egress seal fitting assembly,
   wherein a first of the egress seal annular plate or the instrumentation annular plate is mounted to the base plate, thereby forming an axial passageway, and a second of the egress seal annual plate or the instrumentation annular plate is mounted to the first one, on top of which is mounted the cover plate,
   wherein the egress seal annular plate includes at least one fitting aperture transverse to the axis and in communication with the first aperture of the egress seal annular plate, and
   wherein the at least one fitting aperture is air-cooled and located within a block onto which the egress seal fitting assembly is fastened to receive sensors and air cooling conduits.

2. The assembly as recited in claim 1, wherein the egress seal annular plate includes a multiple of through-slots on a top surface thereof.

3. A gas turbine engine comprising:
   a duct with an instrumentation port along an axis; and
   a modular egress seal assembly mounted to the instrumentation port along the axis, the modular egress seal assembly including
   an egress seal annular plate with a first aperture defined about the axis;
   a base plate including a second aperture extending along the axis;
   an instrumentation annular plate including a third aperture extending along the axis;
   a cover plate; and
   an egress seal fitting assembly,
   wherein a first of the egress seal annular plate or the instrumentation annular plate is mounted to the base plate, thereby forming an axial passageway, and a second of the egress seal annual plate or the instrumentation annular plate is mounted to the first one, on top of which is mounted the cover plate,
   wherein the egress seal annular plate includes at least one fitting aperture transverse to the axis and in communication with the first aperture of the egress seal annular plate, and
   wherein the at least one fitting aperture is air-cooled and located within a block onto which the egress seal fitting assembly is fastened to receive sensors and air cooling conduits.

4. The gas turbine engine as recited in claim 3, wherein at least one of the egress seal annular plate or the instrumentation annular plate includes a multiple of instrumentation lead through-slots on a top surface thereof.

5. The gas turbine engine as recited in claim 3, wherein the at least one fitting aperture includes two (2) fitting apertures within the block.

6. A method of installing a modular egress seal assembly to an instrumentation port in a gas turbine engine comprising:
   mounting a first of an egress seal annular plate or an instrumentation annular plate to a base plate that surrounds an instrumentation port, where the egress seal annular plate includes a first aperture defined about an axis, and where the instrumentation annular plate includes a second aperture defined about the axis;
   mounting a second of the egress seal annular plate or the instrumentation annular plate to the first one;
   fastening an egress seal fitting assembly onto a block to receive sensors and air cooling conduits, the egress seal annular plate including at least one fitting aperture transverse to the axis and in communication with the first aperture of the egress seal annular plate, wherein the at least one fitting aperture is air-cooled and located within the block; and
   topping the egress seal annular plate and the instrumentation annular plate with a cover plate, thereby providing an axial passage into the instrumentation port.

7. The method as recited in claim 6, further comprising:
   mounting the first one to the base plate with a multiple of fasteners which extend therethrough from the cover plate to the base plate.

8. The method as recited in claim 6, further comprising:
   threading an instrumentation lead through one of one or more instrumentation lead through-slots located in a top surface of the egress seal annular plate and the instrumentation annular plate and extending to the first aperture of the respective egress seal annular plate or the second aperture of the instrumentation annular plate.

9. The method as recited in claim 8, further comprising:
   sealing the instrumentation lead in the instrumentation lead through-slot with a potting compound.

* * * * *